US008256992B2

(12) United States Patent
Dickinson, III et al.

(10) Patent No.: US 8,256,992 B2
(45) Date of Patent: Sep. 4, 2012

(54) UNDERGROUND SEQUESTRATION SYSTEM AND METHOD

(75) Inventors: Ben Wade Oakes Dickinson, III, San Francisco, CA (US); Robert Wayne Dickinson, San Rafael, CA (US); Lawrence Joseph Musetti, San Rafael, CA (US); Oliver Douglas Ousterhout, Belvedere, CA (US)

(73) Assignee: SEQEnergy, LLC, San Rafael, CA (US)

( * ) Notice: Subject to any disclaimer, the term of this patent is extended or adjusted under 35 U.S.C. 154(b) by 559 days.

(21) Appl. No.: 12/396,287

(22) Filed: Mar. 2, 2009

(65) Prior Publication Data

US 2009/0220303 A1 Sep. 3, 2009

Related U.S. Application Data

(60) Provisional application No. 61/032,875, filed on Feb. 29, 2008.

(51) Int. Cl.
*B09B 1/00* (2006.01)

(52) U.S. Cl. .... 405/129.1; 405/53; 405/54; 405/129.35; 405/129.5

(58) Field of Classification Search .................... 405/53, 405/54, 55, 129.1, 129.35, 129.45, 129.5, 405/129.55, 129.6
See application file for complete search history.

(56) References Cited

U.S. PATENT DOCUMENTS

| 3,318,380 | A | | 5/1967 | Tenny |
| 5,322,389 | A | * | 6/1994 | Smith ........................ 405/129.3 |
| 5,513,713 | A | | 5/1996 | Groves |
| 6,142,246 | A | | 11/2000 | Dickinson, III et al. |
| 6,238,138 | B1 | * | 5/2001 | Crichlow ................. 405/129.35 |
| 6,409,650 | B2 | * | 6/2002 | Bruno et al. .................. 588/250 |
| 2003/0173082 | A1 | | 9/2003 | Vinegar et al. |
| 2003/0183390 | A1 | | 10/2003 | Veenstra et al. |
| 2004/0146288 | A1 | * | 7/2004 | Vinegar et al. ................ 392/301 |

FOREIGN PATENT DOCUMENTS

| EP | 1770073 A1 | 4/2007 |
| WO | 03/095795 A1 | 11/2003 |
| WO | 2005/012688 A1 | 2/2005 |
| WO | 2007/126676 A2 | 11/2007 |

* cited by examiner

*Primary Examiner* — Tara Mayo-Pinnock
*Assistant Examiner* — Benjamin Fiorello
(74) *Attorney, Agent, or Firm* — Edward S. Wright

(57) ABSTRACT

Underground sequestration system and method in which a liquid or gas is stored in a sequestration zone of enhanced porosity in an underground geological formation, with a containment barrier around the sequestration zone. Conditions within the formation are monitored to verify the integrity of the sequestered substance, and any necessary repair or maintenance is done through wells that extend into the formation. In some disclosed embodiments, the porosity of the formation in the sequestration zone is enhanced by boreholes and laterals that are drilled with high velocity hydraulic cutting jets, and the sequestered liquid or gas is injected into the sequestration zone through the boreholes and laterals. Additional boreholes and laterals are employed in the containment barrier, and the barrier is formed of a thixotropic material that is injected into the formation through the additional boreholes and laterals.

18 Claims, 11 Drawing Sheets

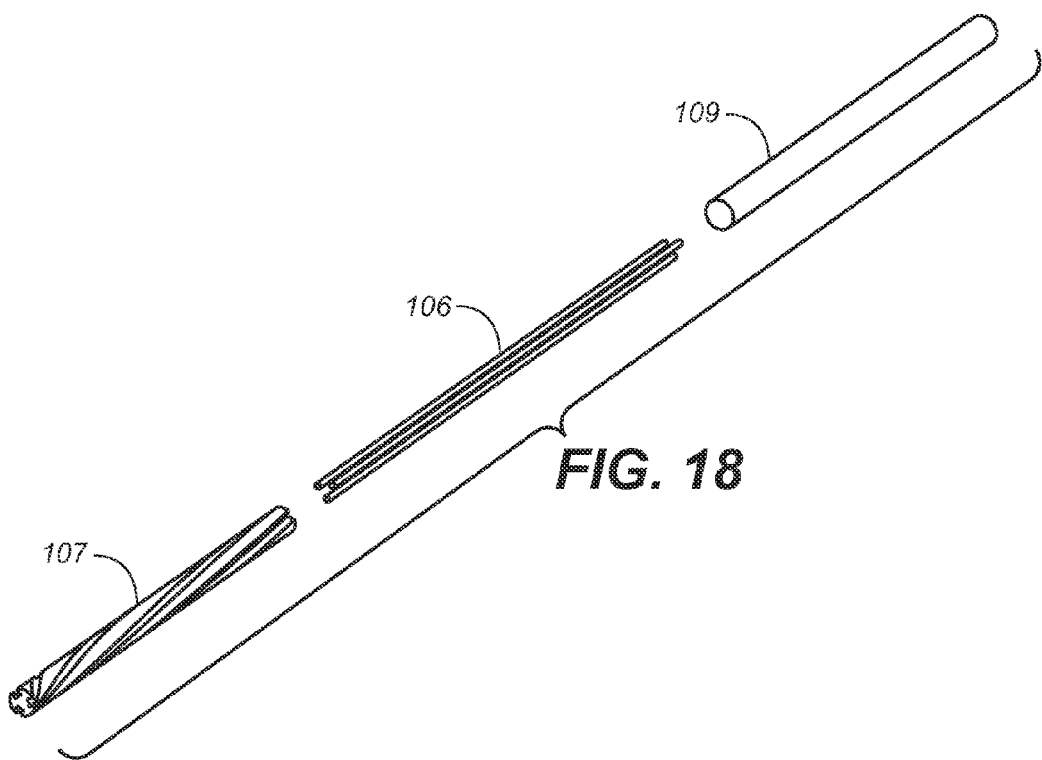
FIG. 18
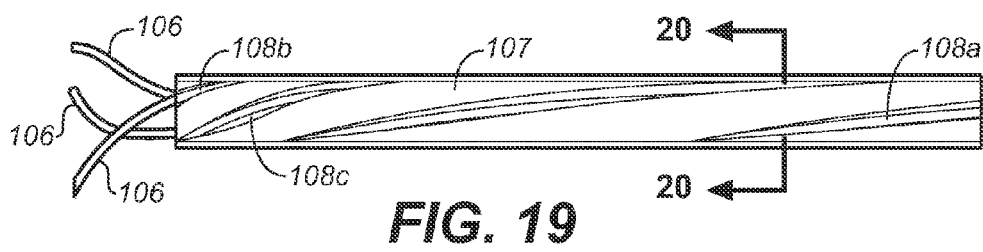
FIG. 19
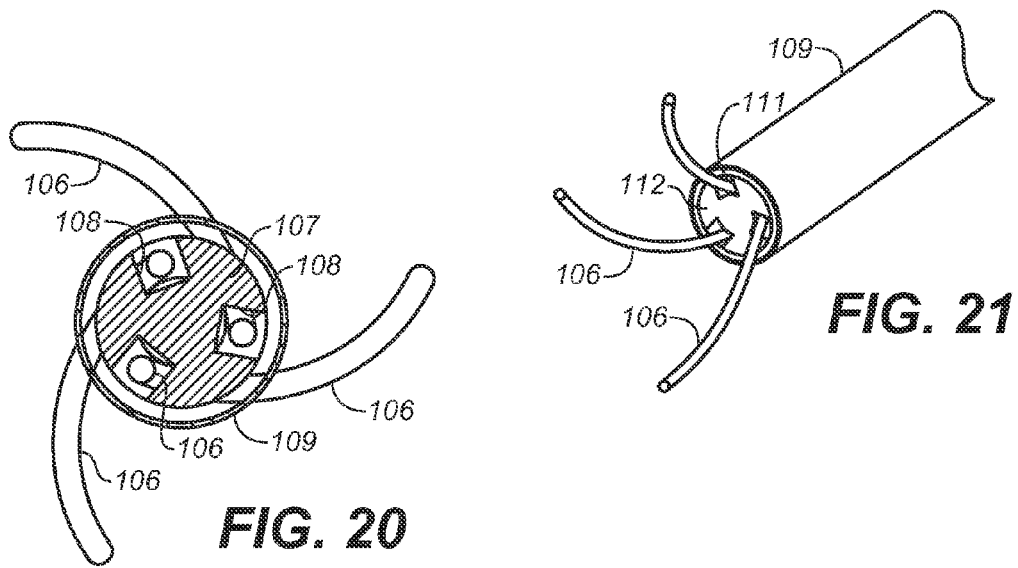
FIG. 20
FIG. 21

UNDERGROUND SEQUESTRATION SYSTEM AND METHOD

RELATED APPLICATION

Provisional Application No. 61/032,875, filed Feb. 29, 2008, the priority of which is claimed.

BACKGROUND OF THE INVENTION

1. Field of Invention

This invention pertains generally to the storage of gases and liquids and, more particularly, to an underground sequestration system and method that are particularly suitable for both long-term and short-term storage of liquids and gases such as $CO_2$, methane, and compressed air.

2. Related Art

With the increasing concern about global warming and the presence in the atmosphere of $CO_2$ and other heat-trapping gases, commonly known as greenhouse gases, there have been numerous efforts to find effective ways of reducing the emissions of such gases before they occur and lowering the impact of such emissions after they do occur.

$CO_2$ is generally considered to be the biggest problem among the greenhouse gases, and by far the largest amount of man-made $CO_2$ comes from the combustion of fossil fuels for electrical power, industrial manufacturing, and transportation. Enormous quantities of $CO_2$ are produced during the combustion of fossil fuels, and since $CO_2$ is a gas, it is extremely difficult to control its emission into the atmosphere.

Since coal is found and produced relatively easily in many parts of the world, including the United States, it is the leading fuel for industrial production. In the United States, coal is the most widely used fuel in the generation of electrical power, accounting for approximately 50 percent of all power produced. Natural gas has become the second most commonly used fuel in the generation of electrical power, and it now accounts for approximately 20 percent of the power produced in the United States. Coal produces by far the most $CO_2$ per BTU of any fossil fuel, and electricity produced from coal results in three times the $CO_2$ emissions of natural gas. Coal is currently responsible for more than 80 percent of the $CO_2$ emissions from power generation.

Numerous political and regulatory initiatives to limit the output of $CO_2$ are currently underway at international, national, and local levels of government. The best known of these is the international agreement known as the Kyoto Treaty in which the signatories agreed to reduce $CO_2$ emissions below 1990 baseline levels by 2020.

One method currently employed in the reduction of $CO_2$ emissions is carbon offsetting where, in essence, one person or entity pays another to reduce or remove global warming pollution in his name. A wide variety of offset methods are presently in use, including tree planting or reforestation, renewable energy, energy conservation, and methane capture. There are, however, serious challenges in the carbon offset market, including technical and financial difficulties encountered by many proposed projects, as well as auditing complexities. In addition, there is continuing debate over the long term effectiveness of certain offset methods, particularly reforestation.

Recycling $CO_2$ is another method of reducing the impact of $CO_2$ emissions that is currently evolving. Such recycling might, for example, be employed the production of industrial commodities from the stack gas effluent of coal-fired power plants, and one company has proposed to use stack gas $CO_2$ to grow algae and then convert the algae to bio-fuel. Another proposal is to combine $CO_2$ with hydrogen from nuclear powered electrolysis or other large sources to produce methanol which could serve as a long term energy substitute for fossil fuels. Such proposals, however, are for the most part still in the research and development stage and have not as yet been proven.

Since the oceans naturally absorb substantial amounts of $CO_2$, some people believe that the oceans offer significant potential to sequester additional large quantities of $CO_2$. However, ocean sequestration is ardently opposed by others on the grounds that it will not work, it will not be permanent, and that it might cause an ecological disaster.

There has also been some consideration given to sequestering $CO_2$ in active or depleted oil and gas fields, and $CO_2$ is currently being injected into geological formations as a stimulant for the production of oil. However, sequestering $CO_2$ in oil and gas fields presents significant problems which will limit the degree to which this approach can effectively address the scale of the emissions reduction challenge. Oil and gas fields leak, as they are intended to do, but $CO_2$ must be placed in secure, permanent reservoirs to effectively mitigate global warming. The injection of $CO_2$ as to enhance production is not sequestration since much of the injected $CO_2$ may be reproduced with the oil. Moreover, most oil and gas fields are long distances from powerhouses and other industrial sources of $CO_2$ emissions, and long distance transport, whether by truck, by rail, or by pipeline, is very expensive.

OBJECTS AND SUMMARY OF THE INVENTION

It is, in general, an object of the invention to provide a new and improved underground sequestration system and method which are particularly suitable for long-term, verifiable sequestration of $CO_2$, especially $CO_2$ from coal-fired power plants.

Another object of the invention is to provide a system and method of the above character which overcome the limitations and disadvantages of sequestration systems and methods heretofore provided.

Another object of the invention is to provide a system and method of the above character which can also be used for both long-term and short-term storage of other gaseous and liquid substances.

These and other objects are achieved in accordance with the invention by providing an underground sequestration system and method in which a liquid or gas is stored in a sequestration zone of enhanced porosity in an underground geological formation, with a containment barrier around the sequestration zone. Conditions within the formation are monitored to verify the integrity of the sequestered substance, and any necessary repair or maintenance is done through wells that extend into the formation.

In some embodiments, the porosity of the formation in the sequestration zone is enhanced by boreholes and laterals that are drilled with high velocity hydraulic cutting jets, and the sequestered liquid or gas is injected into the sequestration zone through the boreholes and laterals. Additional boreholes and laterals are employed in the containment barrier, and the barrier is formed of a thixotropic material that is injected into the formation through the additional boreholes and laterals.

BRIEF DESCRIPTION OF THE DRAWINGS

FIG. 18 is a fragmentary, exploded isometric view of an embodiment of a drilling module or whipstock which is suitable for use in drilling the laterals in the underground sequestration system of the invention.

FIG. 19 is an enlarged centerline sectional view of the embodiment of FIG. 18.

FIG. 20 is an enlarged cross-sectional view taken along line 20-20 in FIG. 19.

FIG. 21 is a block diagram of a system for underground sequestration of liquid $CO_2$ according to the invention.

DETAILED DESCRIPTION

Figure 1:
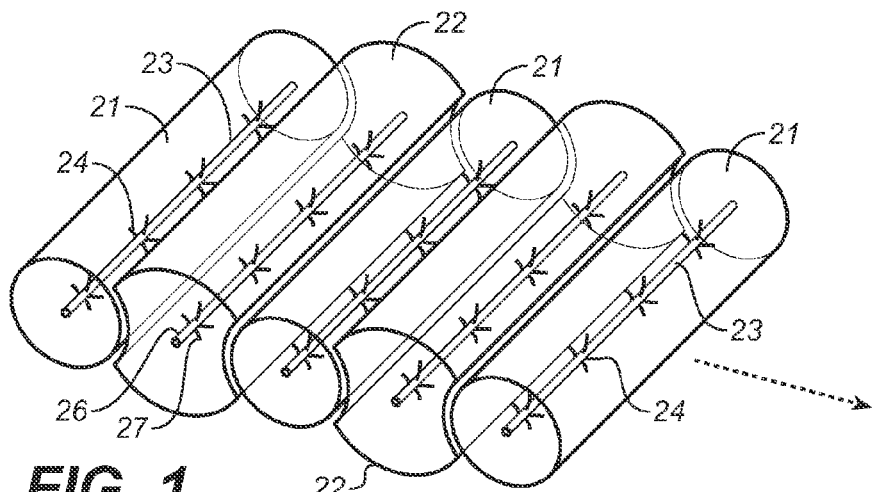
FIG. 1 is a simplified, fragmentary, isometric view of one embodiment of an underground sequestration system according to the invention.
Figure 2:
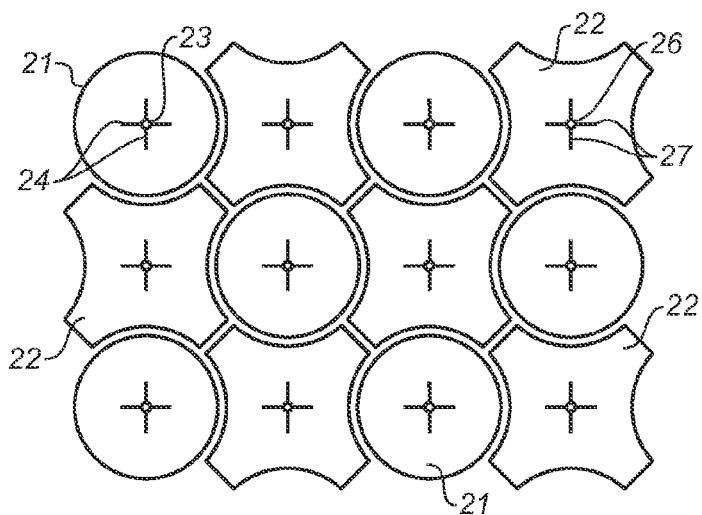
FIG. 2 is a fragmentary sectional view of the embodiment of FIG. 1.

As illustrated in FIGS. 1-4, the underground sequestration system includes an array of sequestration zones 21 and containment zones 22, with the $CO_2$ or other substance being stored in the sequestration zones and the containment zones being interspersed between the sequestration zones. In the sequestration zones, the porosity of the formation is enhanced by horizontally extending boreholes 23 and laterals 24 which extend from the boreholes into the formation to maximize the absorption of the $CO_2$ or other sequestered substance.

The containment zones are formed by drilling additional horizontal boreholes 26 and laterals 27 in the formation between the boreholes and laterals in the sequestration zones and then injecting a sealing material into the formation through them. The sealing material diffuses into the formation and plugs small cracks and fissures in the local geologic structures, forming containment barriers around the sequestration zones that prevent the $CO_2$ or other substance sequestered therein from escaping.

In order to create storage reservoirs that have long-term integrity, the sealing material preferably is one having a long life in terms of geological time as well as being impervious to the sequestered substance. In addition, the barrier material is preferably one which is not brittle so as not to break or fail in the event of an earthquake or other shift in the formation. Suitable sealing materials include loss of circulation materials and other barrier materials similar to those used in the oil and gas industry, typically flexible cements or standard oil field cement, and other materials which are thixotropic or gel-like.

Once the barrier material has been injected and the containment barriers are formed, the $CO_2$ or other substance to be stored is injected into the sequestration zones through boreholes 26 and laterals 27. $CO_2$ is preferably injected and stored in liquid or supercritical form, although it can also be injected and stored in gaseous form, if desired.

Figure 3:
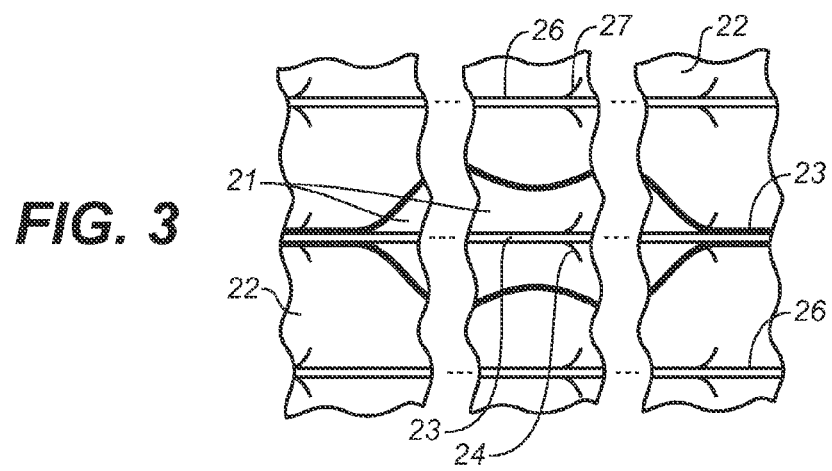
FIG. 3 is a fragmentary top plan view of the embodiment of FIG. 1.
Figure 4:
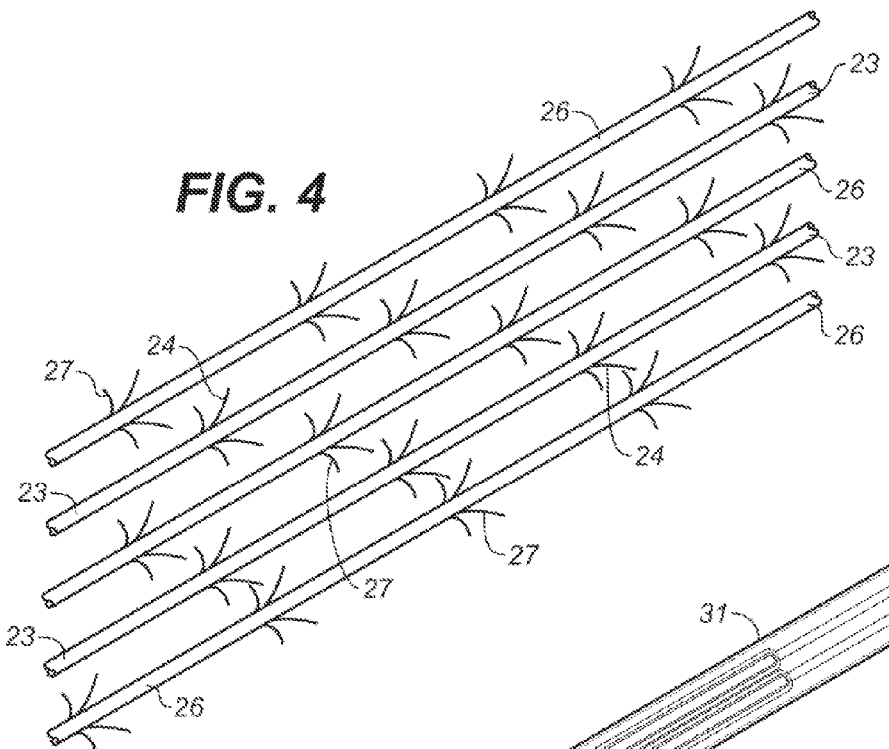
FIG. 4 is a transparent isometric view of some of the boreholes and laterals in the embodiment of FIG. 1.

As illustrated in FIG. 3, the boundaries between the sequestration zones 21 and the containment barriers 22 are irregular and have a shape that is to some extent determined by the structure of the formation in which they are located. Toward the ends of the system, the containment barriers come together and extend beyond the ends of the sequestration zones, thus sealing the ends of the reservoirs or storage chambers.

Means is provided for monitoring and maintaining the reservoirs as well as managing the $CO_2$ or other substance after it has been injected into the sequestration zones. This means includes sensors for leak detection and for auditing and verifying the amount of $CO_2$ sequestered in each of the reservoirs. In the embodiment of FIGS. 1-4, these sensors are inserted into the system through the boreholes 26 in the containment zones and coupled to suitable instrumentation and computers at the surface. Any repairs that may be necessary can also be effected through those boreholes. In the event that it becomes necessary to abandon one or more of the reservoirs, the $CO_2$ or other substance stored therein can be removed through wells drilled for the purpose. The $CO_2$ or other substance sequestered in the chambers remains available and can be recovered for future use at any time, if desired When used for storing $CO_2$ produced by a power plant or other industrial site, the sequestration system can be located directly beneath or near the site where the $CO_2$ is produced, thus avoiding the need for costly transportation of the $CO_2$. The sequestration zones are typically located at depths on the order of 2,000 and more beneath the site. The boreholes can, for example, have a diameter on the order of 8 inches and a length on the order of 1,000 to 5,000 feet, and the laterals can have a diameter of 1.5 to 2 inches. The spacing between the boreholes in the sequestration and containment zones are typically spaced apart by a distance on the order of 50 to 250 feet apart, depending on the geology of the formation and other requirements, and the sequestration chambers are, thus, on the order of 100 to 500 feet wide and as long as is cost effective.

The boreholes and laterals are best drilled hydraulically, utilizing a pressurized drilling fluid with equipment and methods along the lines of those disclosed, for example, in U.S. Pat. Nos. 5,513,713 and 6,142,246. The boreholes are drilled with an elongated tubular drill string which is connected to a source of pressurized drilling fluid at the surface and has a drill head with nozzles that deliver high velocity cutting jets at its distal end. The drill string is propelled through the formation by the pressurized fluid, with the cutting jets blasting away the rock and other material in front of it.

A control module connected between the drill string and the drill head contains instrumentation for sensing the orientation and position of the drill head and valves for controlling the delivery of pressurized fluid to the nozzles to control the direction in which the hole is bored. Once the hole has been drilled to the desired depth, the drill head is steered around a 90 degree bend, and the drilling continues in the horizontal direction until the desired length is reached. The control module and drill head are then removed, and the drill string can be left in place to serve as a casing for the hole, if desired.

Figure 5:
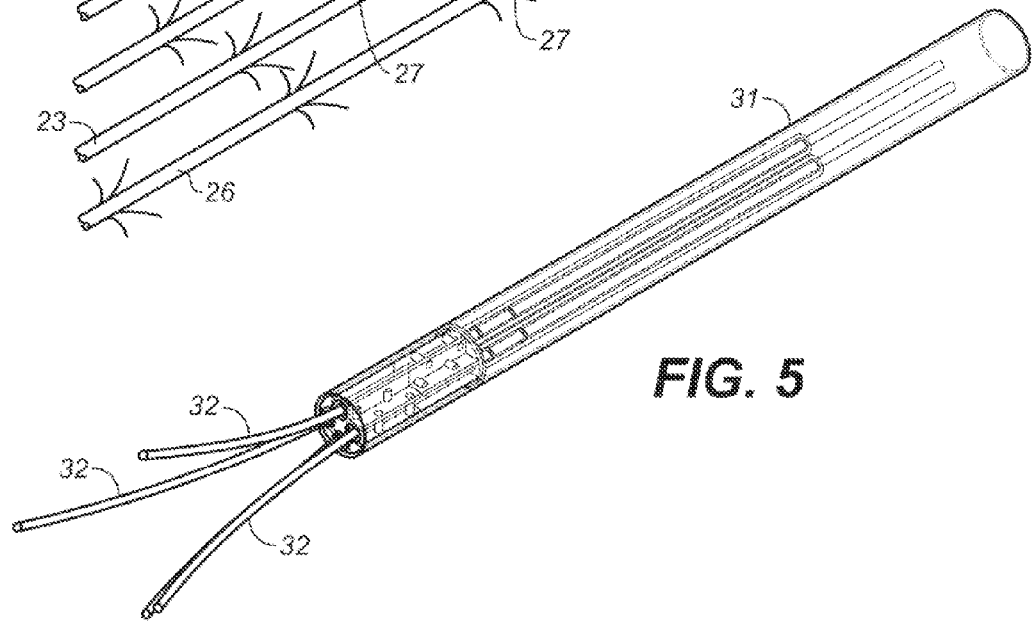
FIG. 5 is an isometric view of one embodiment of a drilling module which is particularly suitable for use in drilling the laterals in the underground sequestration system of the invention.
Figure 6:
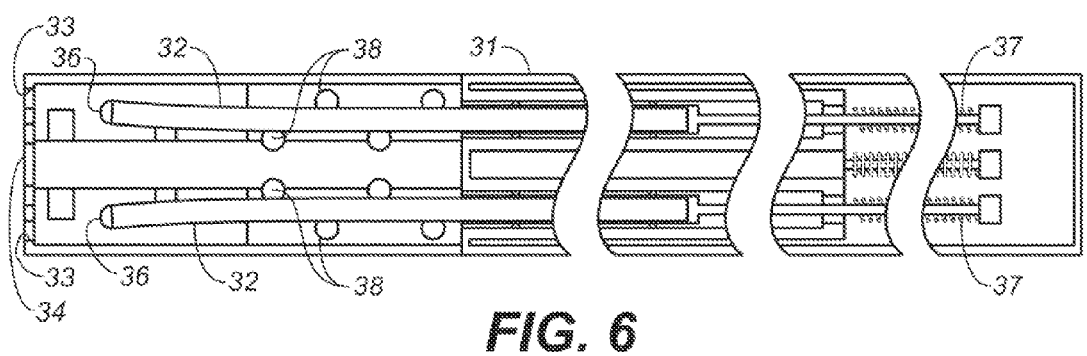
FIG. 6 is an enlarged centerline sectional view of the embodiment of FIG. 5.

After the borehole is drilled and the control module and drill head are removed, another drilling module is inserted into the hole at the end of another drill string to drill the laterals. One embodiment of a module which is particularly suitable for this purpose is illustrated in FIGS. 5 and 6. This module includes an elongated cylindrical housing or canister 31 and a plurality of drilling tubes 32 which can be extended from and retracted into the hosing through openings 33 in an end plate 34 at the front of the housing. In the embodiment illustrated, there are four drilling tubes which are spaced in quadrature about the axis of the housing, but other numbers and arrangements of the tubes can be used as needed.

The drilling tubes have nozzles 36 at their distal ends, and they are propelled in the forward direction, or extended, by the pressurized drilling fluid that is discharged through the nozzles in the form of high velocity cutting jets. Return springs 37 connected to proximal ends of the tubes retract the tubes back into the housing when the drilling is finished.

The drilling tubes are fabricated of a plastically deformable material such as coiled steel tubing. Deformation rollers 38 toward the front of the housing serve as a whipstock, engaging opposite sides of the tubing and bending it as it is extended so that it advances into the formation at an angle of approximately 45 degrees to the axis of the main bore. When the tubing is retracted back into the housing, it is once again deformed by the rollers and returns to its initial linear state.

Figure 7A:
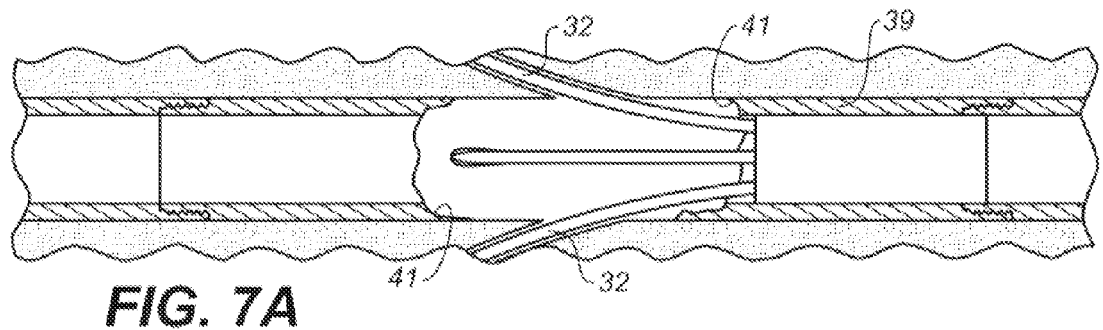
FIGS. 7A-7C are fragmentary centerline sectional views illustrating the manner in which the drilling tubes extend from the drilling module of FIG. 5 and penetrate the casing through which the module is deployed.
Figure 7B:
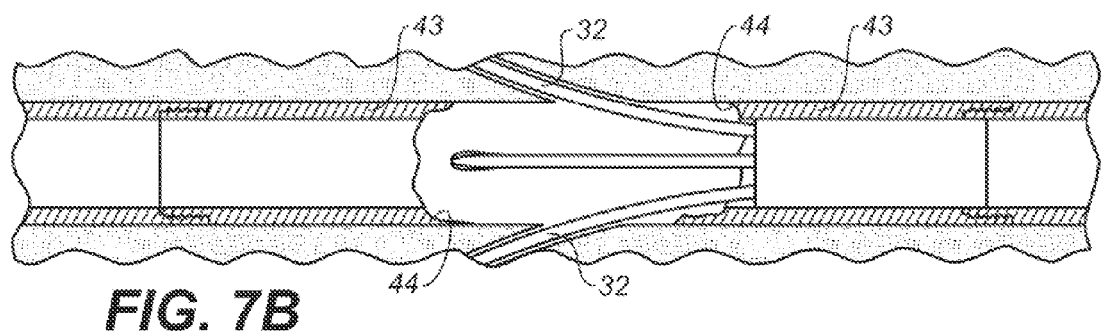
Figure 7C:
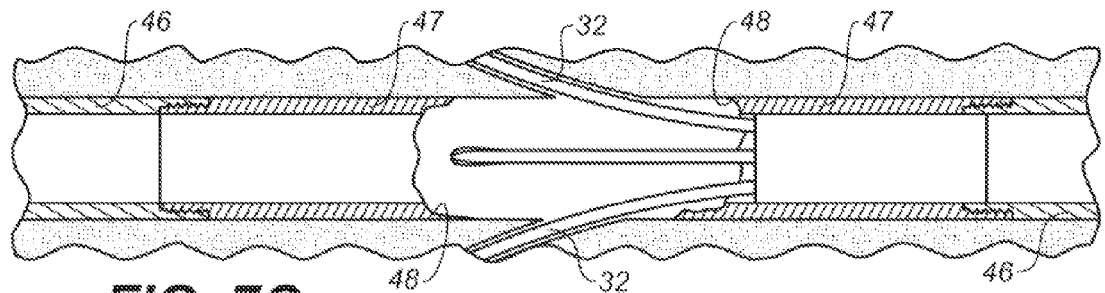

The boreholes are usually lined with a casing through which the drilling tubes must pass in cutting the laterals. With a steel casing 39, as illustrated in FIG. 7A, precut windows 41 are formed in the side wall of the casing where the laterals are to be drilled. With a casing 43 fabricated of a material such as fiberglass, precut windows are not necessary because the high pressure jets can cut through or penetrate the side walls, forming their own openings 44, as illustrated in FIG. 7B. In the embodiment of FIG. 7C, a steel casing 46 is formed with fiberglass sections 47 where the laterals are to be cut, and the high pressure jets again cut their own openings 48 in the fiberglass.

Figure 8:
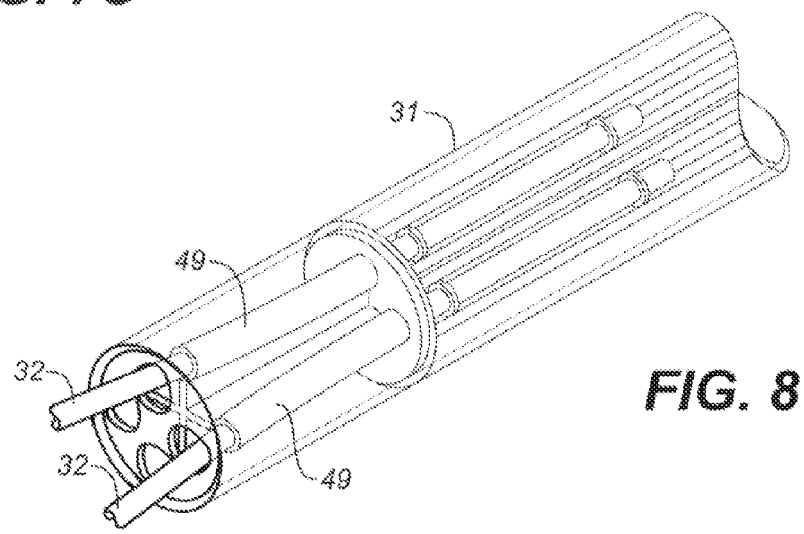
FIG. 8 is a fragmentary isometric view of another embodiment of a drilling module which is suitable for use in drilling the laterals in the underground sequestration system of the invention.
Figure 9A:
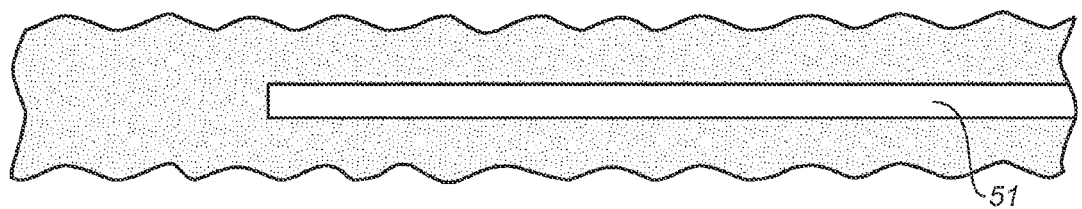
FIGS. 9A-9E are fragmentary sectional views illustrating the operation and use of the drilling modules of FIGS. 5 and 8.
Figure 9B:
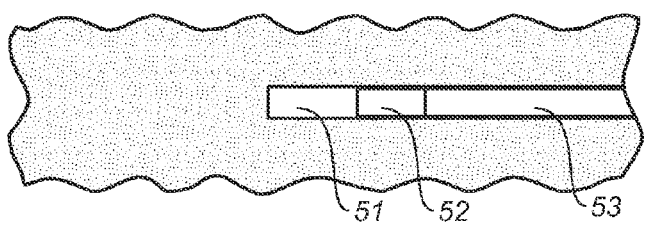
Figure 9C:
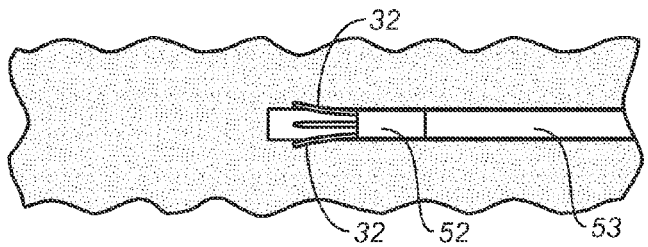
Figure 9D:
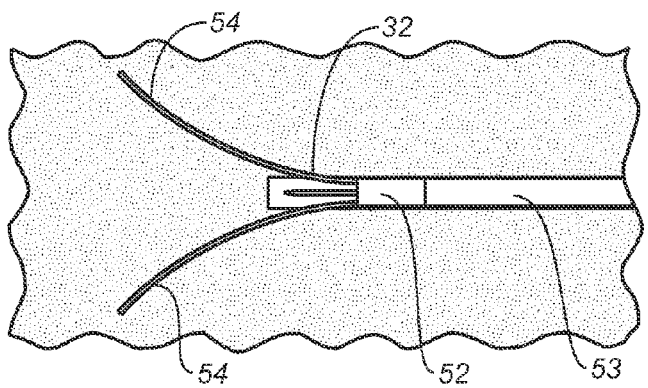
Figure 9E:
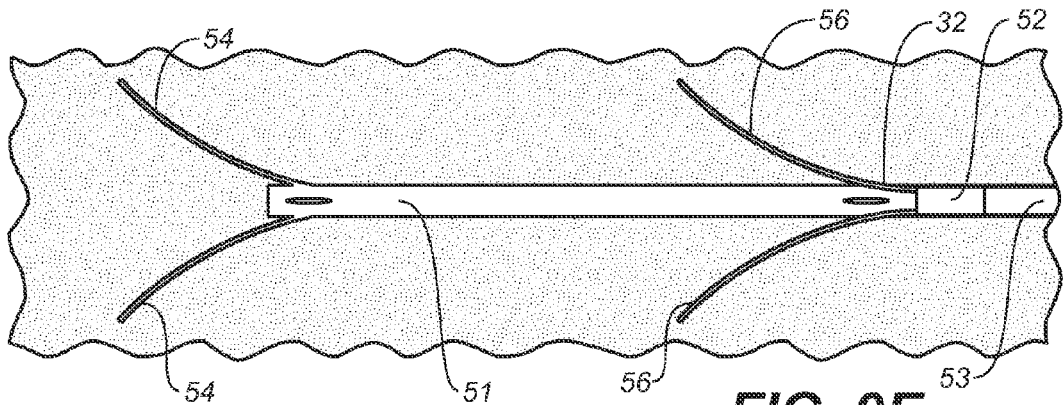

The lateral drilling module shown in FIG. 8 is generally similar to the module of FIGS. 5 and 6, and like reference numerals designate corresponding elements in the two embodiments. The whipstock in embodiment of FIG. 8 differs from that the previous embodiment in that it has guide sleeves 49 instead of rollers for bending and straightening the drilling tubes 32 as they are extended and retracted.

Use of the modules in drilling the laterals is illustrated in FIGS. 9A-9E. A horizontal borehole 51 is drilled in the formation as described above, and a casing (not shown in these figures) is inserted into it. A module 52 of the type shown in FIG. 5 or FIG. 8 is inserted into the borehole at the end of a drill string 53 until it reaches the location where the most distal group of laterals 54 is to be drilled. Hydraulic pressure within the drill string then pushes out, or extends, the coiled tubing 32, and jets at the ends of the tubing drill through the formation. As the tubing advances, deformation rollers 38 or guide sleeves 49 bend it so that it flares away from the axis of the bore until it reaches its fully extended position. Upon completion of the laterals 54, the hydraulic pressure is relaxed, and the springs 37 retract the drilling tubes back into the housing. As the coiled tubing passes through the deformation rollers or guide sleeves, it is once again plastically deformed and returns to its linear state. The module is then pulled back by the drill string, and the lateral drilling process is repeated at the next desired location, forming laterals 56. This process is repeated until the desired number of laterals has been drilled, whereupon the module is withdrawn, and the borehole and laterals are ready to receive the barrier material or the $CO_2$ or other substance to be sequestered.

Any suitable drilling fluid, such as water, can be used. However, in sites where $CO_2$ is to be stored, it may be advantageous to use liquid $CO_2$ as the drilling fluid for the boreholes and laterals in the sequestration zones.

Figure 10:
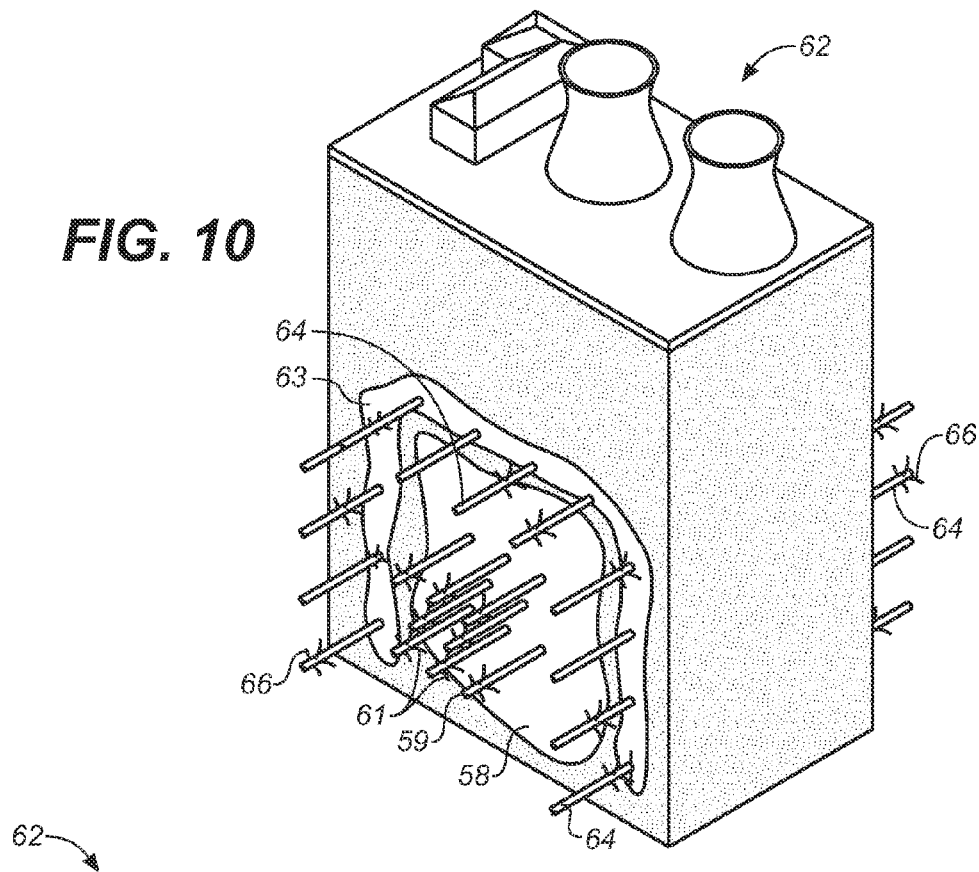
FIG. 10 is a fragmentary isometric view of another embodiment of an underground sequestration system according to the invention.
Figure 11:
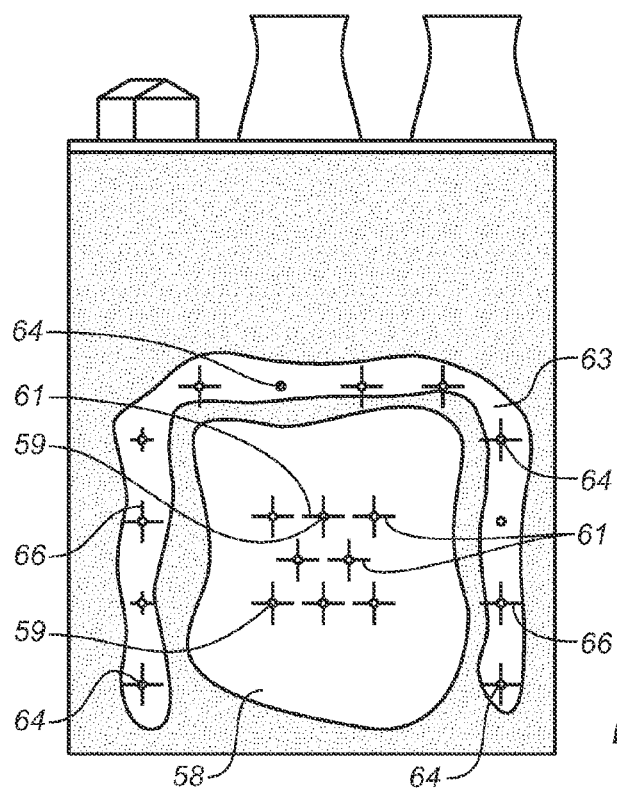
FIG. 11 is a sectional view of the embodiment of FIG. 10.

The embodiment of FIGS. 10 and 11 has a single, relatively large sequestration zone 58 with a plurality of boreholes 59 and laterals 61 located directly beneath a coal-fired power plant 62. The boreholes are arranged in an array and, as in the other embodiments, the boreholes and laterals serve both to enhance the porosity of the formation and as a means for injecting $CO_2$ into the sequestration zone.

In this embodiment, a containment barrier 63 extends continuously above and along the sides of the sequestration zone. This barrier is formed by drilling boreholes 64, and laterals 66 in the formation above and to the sides of the sequestration zone and injecting the barrier material into the formation through them. The side walls can be extended down to increase the size of the sequestration zone without increasing the footprint of the system at the surface.

Since the barrier is open at the bottom, it can be extended to a greater depth than the sequestration zone to ensure that $CO_2$ will not escape through the open bottom. As in the other embodiments, the $CO_2$ is not injected into the sequestration zone until the containment barrier is in place.

Monitoring and repair are done through the boreholes 64 and laterals 66 in the containment barrier. If monitoring and/or repair are needed in other areas, additional wells can be drilled.

Figure 12:
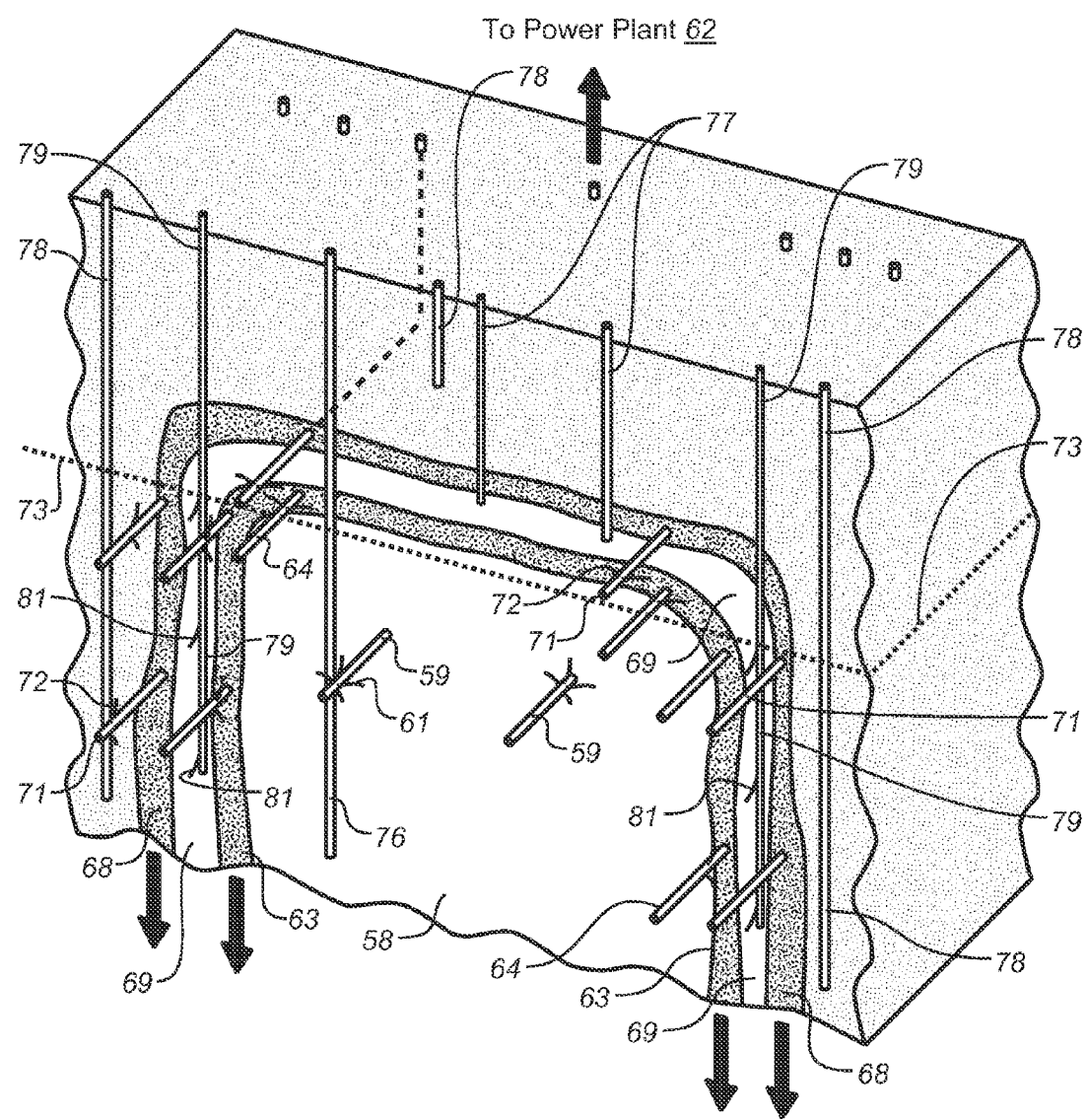
FIG. 12 is a fragmentary isometric view of another embodiment of an underground sequestration system according to the invention.

The embodiment of FIG. 12 is generally similar to the embodiment of FIGS. 10 and 11, and like reference numerals designate corresponding elements in the two. The embodiment of FIG. 12, however, has a double wall containment barrier consisting of inner wall 63 and an outer wall 68, with a monitoring and repair zone 69 between the two walls. Outer wall 68 is formed in the same manner as inner wall 63, with boreholes 71 and laterals 72 through which the barrier material is injected. In this embodiment, the laterals in the portions of the barrier walls above the sequestration zone extend horizontally from the boreholes, and the laterals in the portions of the walls to the sides of the sequestration zone extend vertically. This helps in forming the walls so with the horizontal portions above the sequestration zone and the vertical portions on the sides.

Formation of the top and side portions of the walls in their respective horizontal and vertical directions is further encouraged and enhanced by positioning the barrier at a depth in the formation where fracturing due to tectonic forces changes from horizontal to vertical. In FIG. 12, the transition zone is indicated by dotted line 73, with boreholes above the sequestration zone being located above the transition zone and the boreholes to the sides being located below it.

Hydraulic fracturing is used extensively in the oil and gas industry to enhance production of formation fluids and gases from producing wells and it is also extensively used to enhance injection of fluids into subsurface strata for disposal of produced water, storage of natural gas and for pressure maintenance of mature fields. Hydraulic fracturing is a means of increasing the effective wellbore area by creating a highly conductive fracture exposing a large surface area of the formation to improve the inflow or outflow of fluids and gases.

Hydraulic fractures are created by overcoming the pore pressure and tensile strength of the strata being treated using a liquid, gas or a combination of both. The fracture will propagate perpendicular to the least principle stress, which normally consists of two principle horizontal stress directions and one vertical stress direction. If the horizontal stresses are greater than the vertical stress (usually less than 3000 ft in depth), then the fracture will radiate outward from its source as a horizontal "pancake" fracture with a radius in tens to hundreds of feet and a width of tenths of inches. If the vertical stress is greater than either horizontal stress, then the fracture will be vertical growing in length in tens to hundreds of feet, height in tens to hundreds of feet and width of tenths of inches. The fracture height growth is a function of changes in stress in the layers of strata due principally to lithology and pore pressure differences, which tend to remain similar in a given strata. The length, height and width of hydraulic fractures are controlled by many factors that are well known to persons skilled in the art.

In underground sequestration, hydraulic fracturing improves the ability to inject or place both sealant for the outer walls of the container and the gas to be sequestered within the container.

Instrumentation or monitoring wells 76, 77, and 78 are drilled into the sequestration zone, the monitoring and repair zone between the containment walls, and the formation outside the containment walls. As in the other embodiments, sensors introduced through these wells can be interfaced with instrumentation and computers at the surface, and the boreholes and laterals in the containment walls can also be used for instrumentation and repair.

Figure 13:
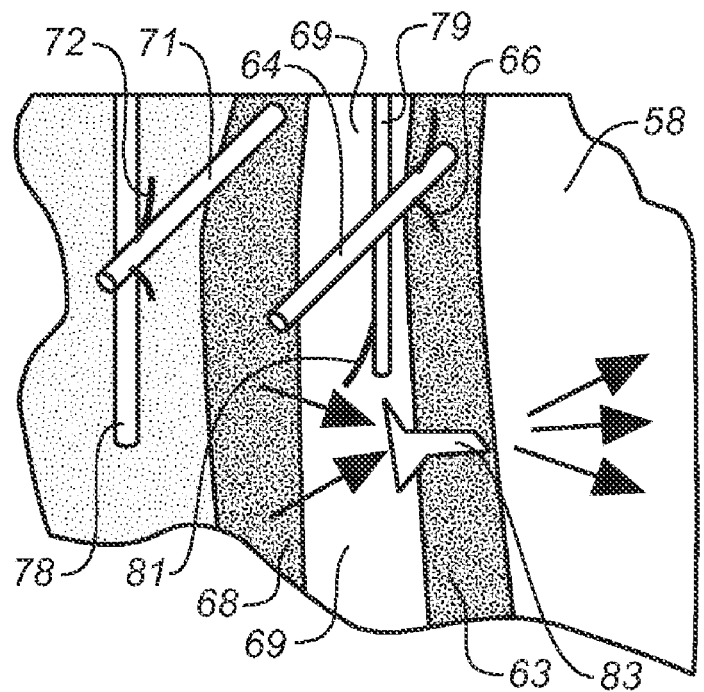
FIGS. 13 and 14 are enlarged, fragmentary views illustrating the manner in which leaks are sealed in the embodiment of FIG. 12.
Figure 14:
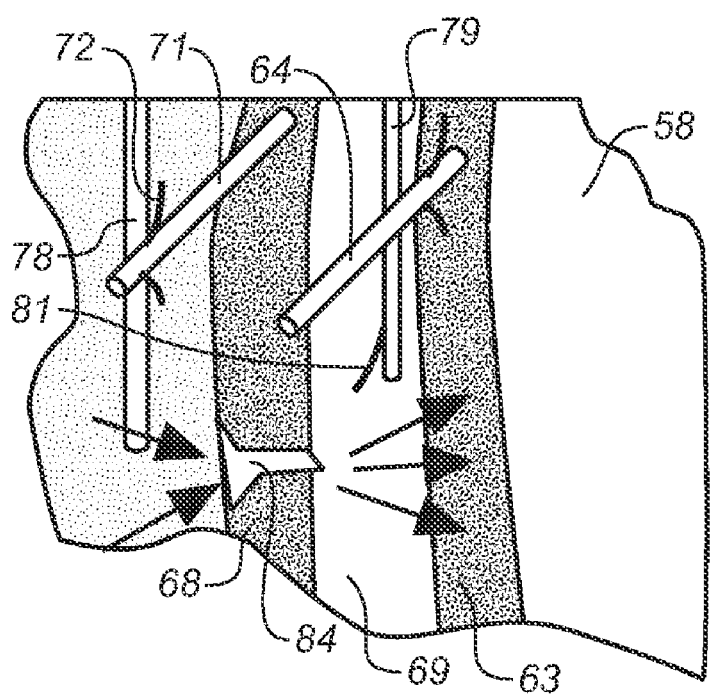

Repair wells 79 with laterals 81 are drilled into the instrumentation and repair zone 69 between the containment walls and into the formation outside the walls, and the instrumentation and repair zone also contains a self-sealing leak repair material. The normal primary hydrostatic pressure of the formation outside the containment walls is higher than the pressure in the zone between them, and the pressure in the sequestration zone is lower than the pressure between the walls. Thus, as illustrated in FIG. 13, if a leak 83 occurs in inner wall 63, the pressure difference between the repair zone and the sequestration zone forces the self-sealing material from the repair zone into the opening, and the leak is quickly repaired. Likewise, in the event of a leak 84 in the outer wall, the difference in pressure outside the wall and between the walls forces self-sealing repair material injected into the formation outside the wall to flow into the opening and repair the leak. Simultaneous leakage of the inner and outer walls is mutually self-limiting.

Figure 15:
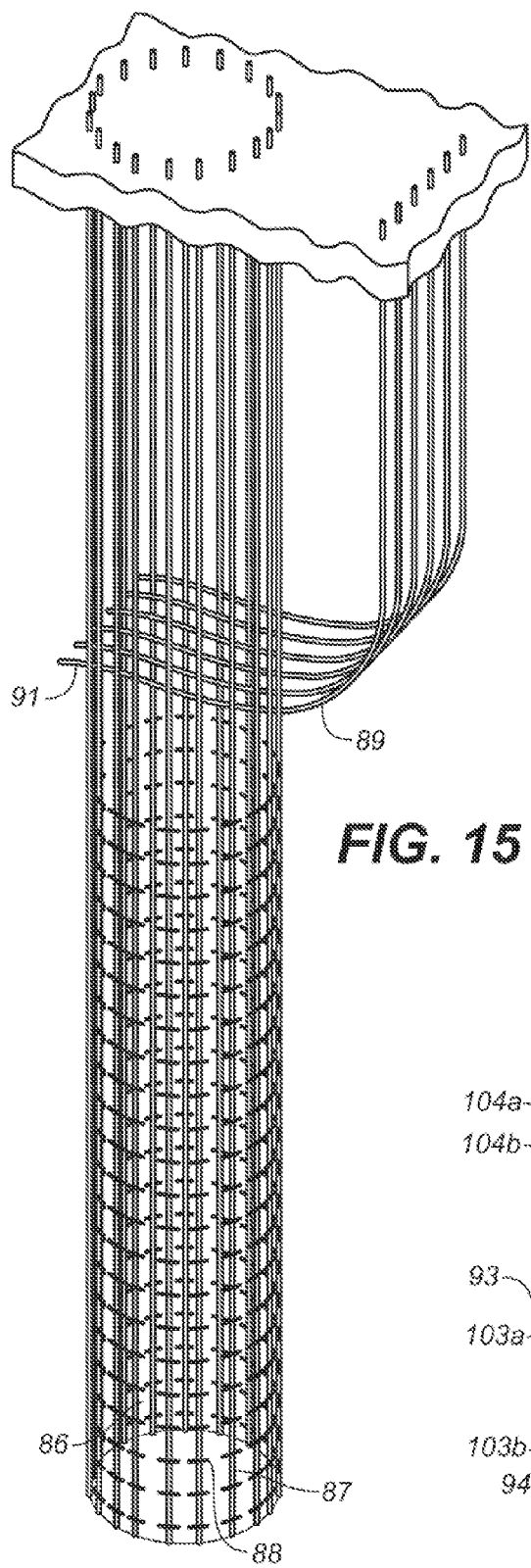
FIG. 15 is an isometric view of some of the boreholes and laterals employed in another embodiment of an underground sequestration system according to the invention.
Figure 16:
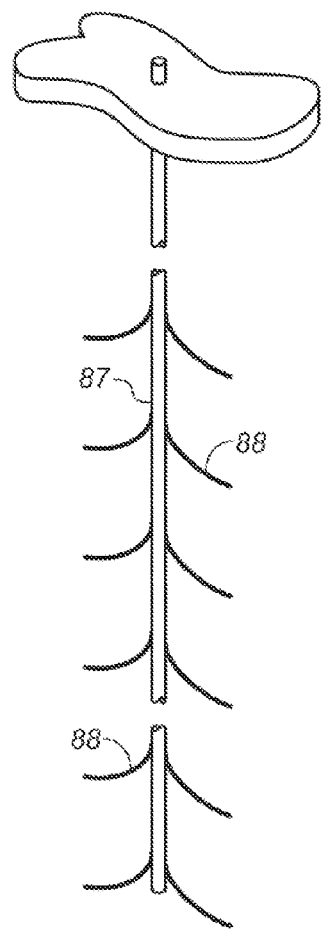
FIG. 16 is an enlarged, fragmentary isometric view of one of the boreholes and laterals in the embodiment of FIG. 15.

In the embodiment of FIG. 15, the sequestration zone or chamber 86 extends vertically and is bounded by a plurality of vertically extending wells or boreholes 87 with laterals 88 extending therefrom. These laterals typically have a length of about 50 feet and a radius of curvature of about 30 feet. As in the other embodiments, a sealing or barrier material is injected into or placed in the formation through the boreholes and laterals to form a barrier wall. In the example shown in FIG. 15, the containment wells are arranged in a circular pattern, but they can be arranged in any other suitable manner such as a square pattern or a rectangular pattern.

The upper end of the sequestration zone is closed by a wall formed continuously with the side wall by injecting the barrier material through horizontally extending boreholes 89 and laterals 91 which intermesh with the vertically extending boreholes and laterals.

As in the other embodiments, additional boreholes and laterals (not show) are formed in the sequestration zone for injection of the substance to be stored, and monitoring and repair wells (likewise, not shown) are provided both within the sequestration zone and outside the barrier.

The sequestration zone is preferably located at a depth of approximately 2,000 to 5,000 feet in order to take advantage of tectonic stress hydro-fracturing. As discussed above, the induced fractures will generally be horizontal down to a depth of about 2,000 to 3,000 feet and vertical below that depth. The azimuth of the hydro-fractures will be perpendicular to the local least principal tectonic stress.

The bottom of the sequestration zone can either be closed off, e.g. with conventional oil field cement squeezing, or it can be left open. With liquid carbon dioxide (LCO2), the fluid pressure of the trapped LCO2 should be held in place by intrinsic hydrostatic pressure balancing, or buoyancy.

Figure 17:
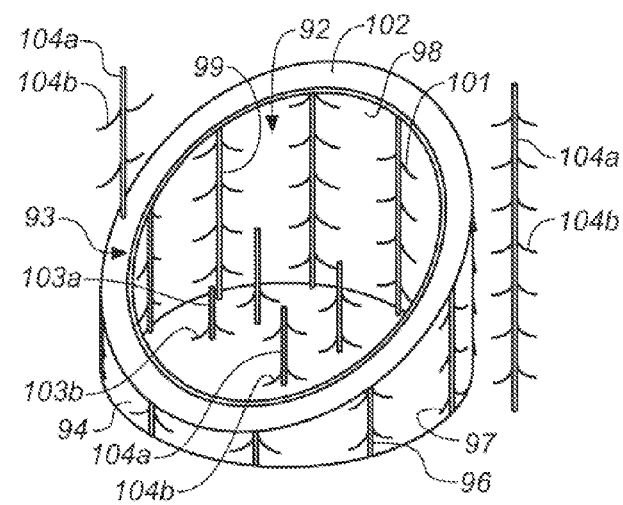
FIG. 17 is a fragmentary isometric view of another embodiment of an underground sequestration system according to the invention.

FIG. 17 illustrates a vertically extending sequestration zone 92 with a double-wall containment barrier 93. In this embodiment, an outer layer of containment material 94 is placed in the formation through a circular array of boreholes 96 and laterals 97, and an inner layer of containment material 98 is placed through an inner array of boreholes 99 and laterals 101 disposed concentrically within the outer array, with a containment zone 102 between the two layers.

Injection wells 103 are formed in the sequestration zone, and instrumentation and repair wells 104 are formed in the sequestration zone, outside the barrier walls, and in the containment zone. Wells 103, 104 have boreholes 103a, 104a and laterals 103b, 104b. As in the other embodiments, the instrumentation and 25 repair wells provide means for monitoring the sequestered substance and the condition of the containment walls, in situ repair of the containment walls, and auditing of the sequestered substance.

FIGS. 18-21 illustrate another embodiment of a whipstock which can be used in drilling the laterals. In this embodiment, the drilling module has three drilling tubes 106 fabricated of a plastically deformable material such as coiled steel tubing, and the whipstock has an elongated cylindrical mandrel 107 with grooves 108 opening through its outer surface. The grooves are spaced circumferentially about the mandrel and extend in a helical fashion, with a pitch that increases toward the distal end of the mandrel. In the embodiment shown, the pitch of the grooves has a first, relatively gentle pitch 108a toward the proximal end of the mandrel and a second, steeper pitch 108b toward the distal end, with a transition zone 108c between the two. In other embodiments, the pitch could increase in a continuous, uniform manner from the proximal end to the distal end, if desired.

The mandrel is enclosed within a cylindrical housing or casing 109 which passes through the well casing (not shown)

and retains the drilling tubes in the grooves. When extended, the drilling tubes pass through openings 111 in the end wall 112 of the housing.

Figure 22:
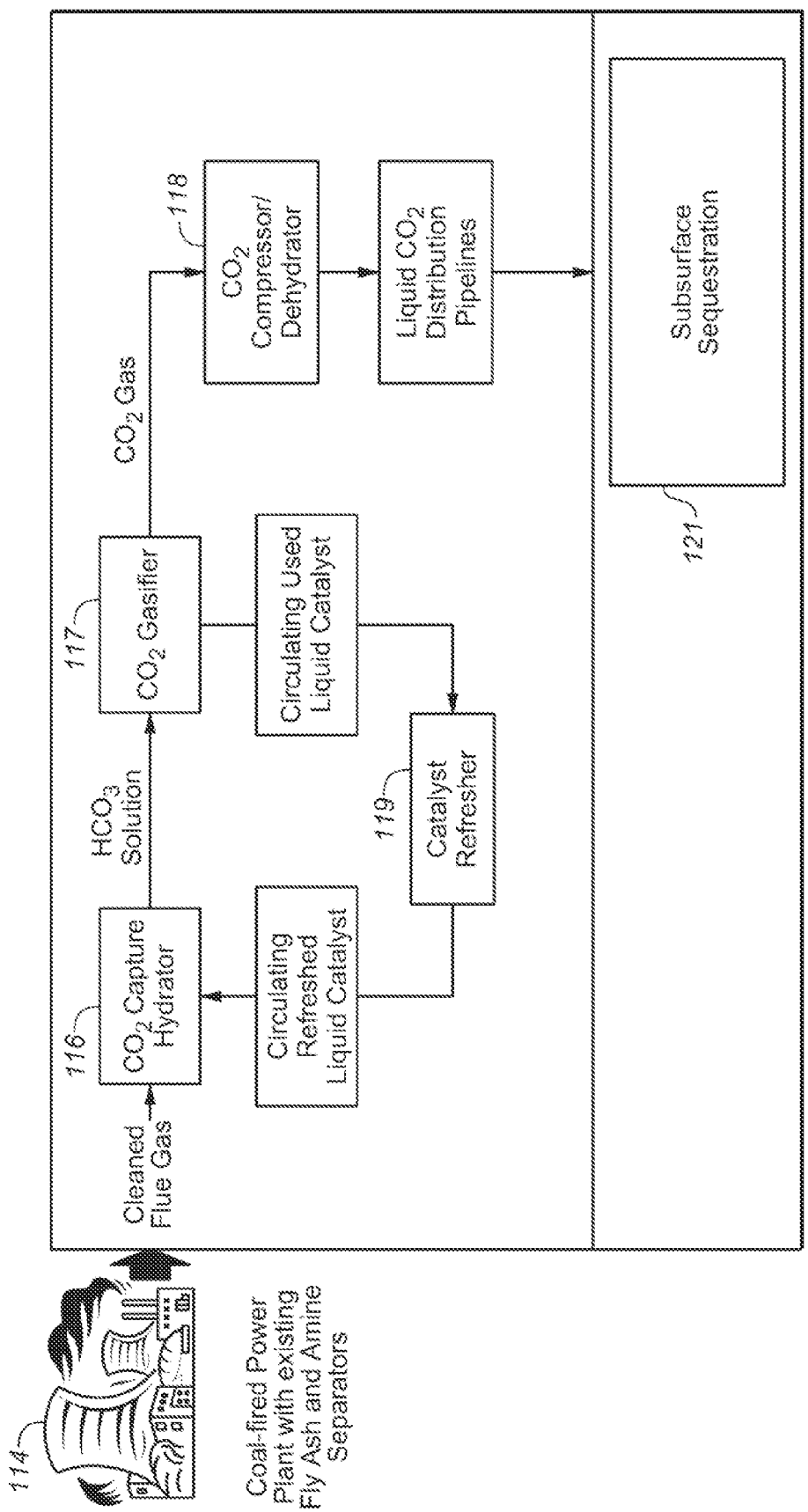
FIG. 22 is a fragmentary isometric view of the embodiment of FIG. 19.

FIG. 22 shows a system for sequestering CO2 from a coal-fired power plant 114 in liquid form. Cleaned flue gas from the plant is delivered to a CO2 capture hydrator 116 which delivers HCO3 to a CO2 gasifier 117. CO2 gas from the gasifier is delivered to a CO2 compressor and dehydrator 118. Used liquid catalyst is recovered from the gasifier and refreshed by a catalyst refresher 119, and the refreshed catalyst is returned to the hydrator. Liquid CO2 from the compressor and dehydrator is injected into an underground sequestration system 121.

While the sequestration system and method of the invention are particularly suitable for long-term or permanent storage of CO2 and other greenhouse gases in close proximity to the sites where they are produced, the invention can also be utilized effectively for sequestering any liquid or gaseous substance where long-term storage or permanence is required. It can also be utilized for storing substances such as CO2 or methane on a short-term basis for retrieval and use at a future time.

Figure 23:
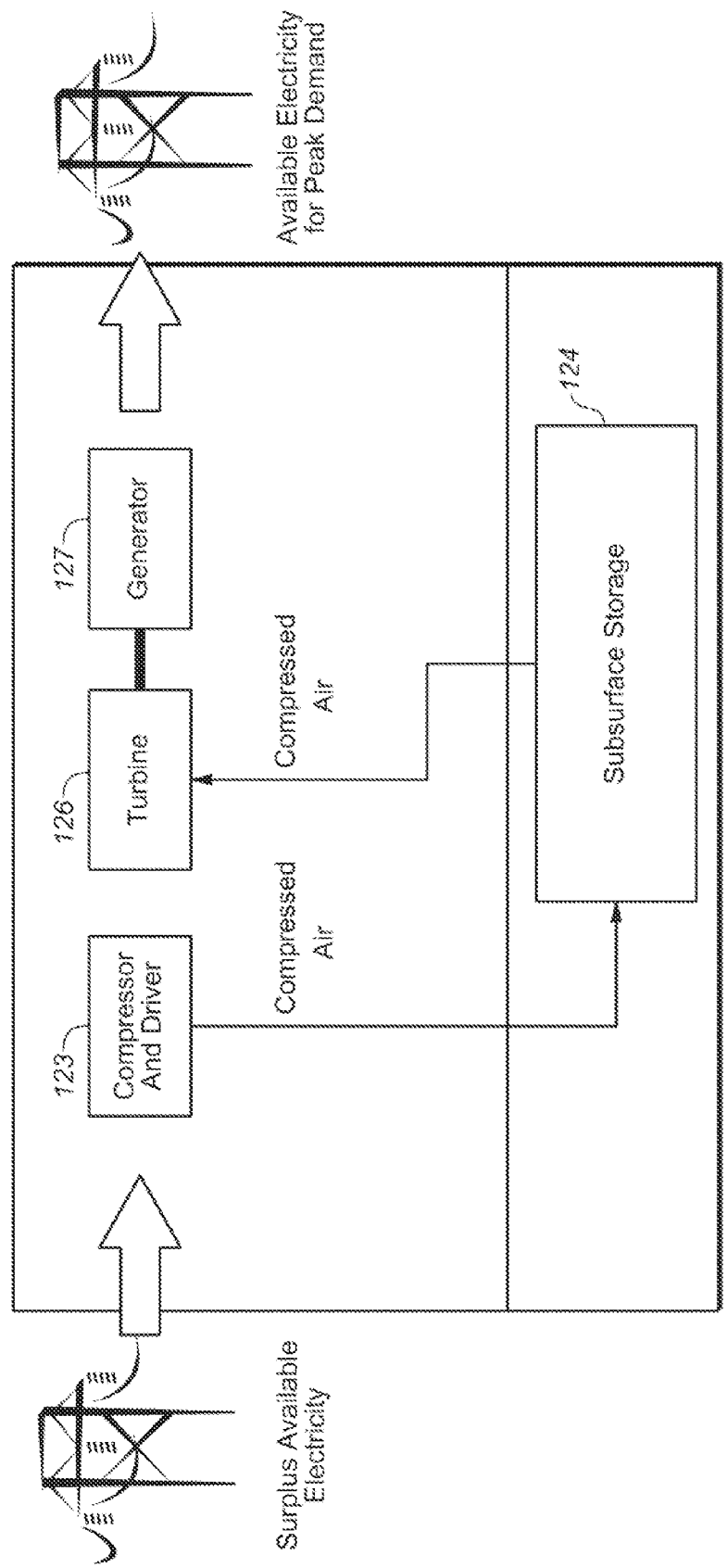
FIG. 23 is a block diagram of one embodiment for a diurnal electric power generating system with underground storage of compressed air in accordance with the invention.

The sequestration system has also been found to be particularly suitable for use in short-term storage of compressed air, and one embodiment of an energy storage and electric power generating system with underground storage of compressed air is illustrated in FIG. 23. In this embodiment, surplus available electrical power is utilized in driving a compressor 123 which delivers compressed air to an underground sequestration system 124. That system can, for example be of the type shown in FIG. 17, with a rectangular shape and a closed bottom of squeezed oil field cement being preferred in this application.

When the demand for electrical power increases, the compressed is recovered from the underground storage site and utilized in driving a turbine 126 which, in turn, drives a generator 127.

The compressed air is preferably stored at a pressure on the order of 1,000 psi, or less, which is less than the hydrostatic pressure of the formation at a depth on the order of 2,000 to 5,000 feet. With a hydrostatic pressure that increases at a rate of 0.45 psi per foot, the pressure at a depth of 2,000 to 5,000 feet is on the order of 900 to 2,250 psi.

If the surplus power comes from a solar generating system, the compressed air storage can be cycled daily in order to extend the availability of the diurnally produced energy from direct solar conversion and thereby enhance the availability of that cyclic energy for base loading. The sequestration site can be located adjacent to or under the solar energy direct conversion power generating facility to eliminate the cost of transporting the compressed air and to minimize the total surface footprint of the system.

The invention has a number of important features and advantages. It provides an economically viable system and method for long-term, verifiable sequestration of CO2 and other substances. It is particularly suitable for sequestering large amounts of CO2 from coal-fired power plants, and since it can be located directly beneath or near the plants, it eliminates the cost of transporting the CO2 to a remote site. With continuous monitoring and repair, the system makes it possible to manage and maintain CO2 storage over very long periods of time, e.g. hundreds or thousands of years.

The system can be located in many kinds of sedimentary and crystalline geological structures, particularly those with reasonable intrinsic porosity, permeability, and potential saturation for fluids such as carbon dioxide and air.

It is apparent from the foregoing that a new and improved underground sequestration system and method have been provided. While only certain presently preferred embodiments have been described in detail, as will be apparent to those familiar with the art, certain changes and modifications can be made without departing from the scope of the invention as defined by the following claims.

The invention claimed is:

1. An underground sequestration system, comprising: a horizontally extending sequestration zone of enhanced porosity in an underground geological formation, a fluid substance stored in pores in the formation in the sequestration zone, and sealing material injected into pores in the formation adjacent to the sequestration zone forming a containment barrier for the fluid substance stored the sequestration zone, the containment barrier including an inner containment wall in the formation above and to the sides of the sequestration zone, an outer containment wall spaced above and to the sides of the inner containment wall, and a monitoring and maintenance space between the inner and outer containment walls.

2. The sequestration system of claim 1 wherein the inner and outer containment walls each include a plurality of horizontally extending boreholes with laterals extending therefrom, and the walls are formed of a thixotropic material injected into the formation through the boreholes and laterals in the walls.

3. The sequestration system of claim 2 wherein the laterals extend horizontally in the walls above the sequestration zone and vertically in the walls to the sides of the sequestration zone.

4. The sequestration system of claim 1 including a monitoring well which extends into the monitoring and maintenance space between the inner and outer containment walls.

5. The sequestration system of claim 1 including a repair well which extends into the monitoring and maintenance space between the inner and outer containment walls.

6. The sequestration system of claim 1 wherein the sequestered fluid substance is selected from the group consisting of liquid CO2, a greenhouse gas, methane gas, and air.

7. The sequestration system of claim 1 wherein the sequestration zone is located in a formation near a power generating plant, and the fluid substance stored in the sequestration zone is CO2 from the power generating plant.

8. A method of sequestering a fluid substance in an underground geological formation, comprising the steps of: enhancing the porosity of the formation, defining a sequestration zone in a portion of the formation where the porosity has been enhanced, drilling a set of horizontally extending boreholes in the formation, drilling a plurality of laterals that extend from the boreholes and into the formation in the sequestration zone, drilling first sets of vertically spaced, horizontally extending boreholes into the formation on opposite sides of the sequestration zone, drilling second sets of vertically spaced, horizontally extending boreholes into the formation beside the first sets, drilling laterals that extend into the formation from the boreholes in the first and second sets, drilling first and second sets of horizontally spaced and horizontally extending boreholes into the formation above the sequestration zone, drilling laterals that extend horizontally into the formation from the first and second sets of boreholes above the sequestration zone, injecting a sealing material into the formation through the boreholes and laterals above and on the sides of the sequestration zone to form a double wall containment barrier around the top and sides the sequestration zone, injecting the fluid substance into the sequestration zone through the boreholes and laterals in the sequestration zone, and storing the fluid substance in the sequestration zone.

9. The method of claim 8 wherein the laterals extend vertically from the boreholes on the sides of the sequestration zone, horizontally from the boreholes above the sequestration zone, and in multiple directions from the boreholes in the sequestration zone.

10. The method of claim 9 wherein some of the boreholes and laterals on the sides of the sequestration zone are located deeper in the formation than the boreholes and laterals in the sequestration zone, and the portions of the containment barrier on the sides of the sequestration zone extend to a greater depth than the sequestration zone.

11. The method of claim 9 wherein the boreholes above the sequestration zone are located at a depth where tectonic forces produce horizontal fracturing of the formation, and the boreholes to the sides of the sequestration zone are located at depths where the tectonic forces produce vertical fracturing of the formation.

12. The method of claim 8 including the steps of drilling a well into the sequestration zone, and monitoring conditions in the sequestration zone through the well.

13. The method of claim 8 including the steps of drilling a well into a region between the walls of the containment barrier, and monitoring conditions between the walls through the well.

14. The method of claim 8 including the steps of drilling wells into the formation near the outer wall of the containment barrier, and monitoring conditions in the formation outside the barrier through the wells.

15. The method of claim 8 including the steps of drilling a repair well into a region between the walls of the containment barrier, and injecting sealing material into the region between the walls through the repair well.

16. The method of claim 8 wherein the sequestered fluid substance is selected from the group consisting of liquid $CO_2$, a greenhouse gas, methane gas, and air.

17. The method of claim 8 wherein the sequestration zone is located in a formation near a power generating plant, and $CO_2$ from the power generating plant is stored in the sequestration zone.

18. The method of claim 8 wherein the boreholes and laterals are drilled with pressurized fluid.

* * * * *